March 10, 1953 D. H. MILLER 2,630,907
STABLE GUTTER CLEANER
Filed June 21, 1951 2 SHEETS—SHEET 1
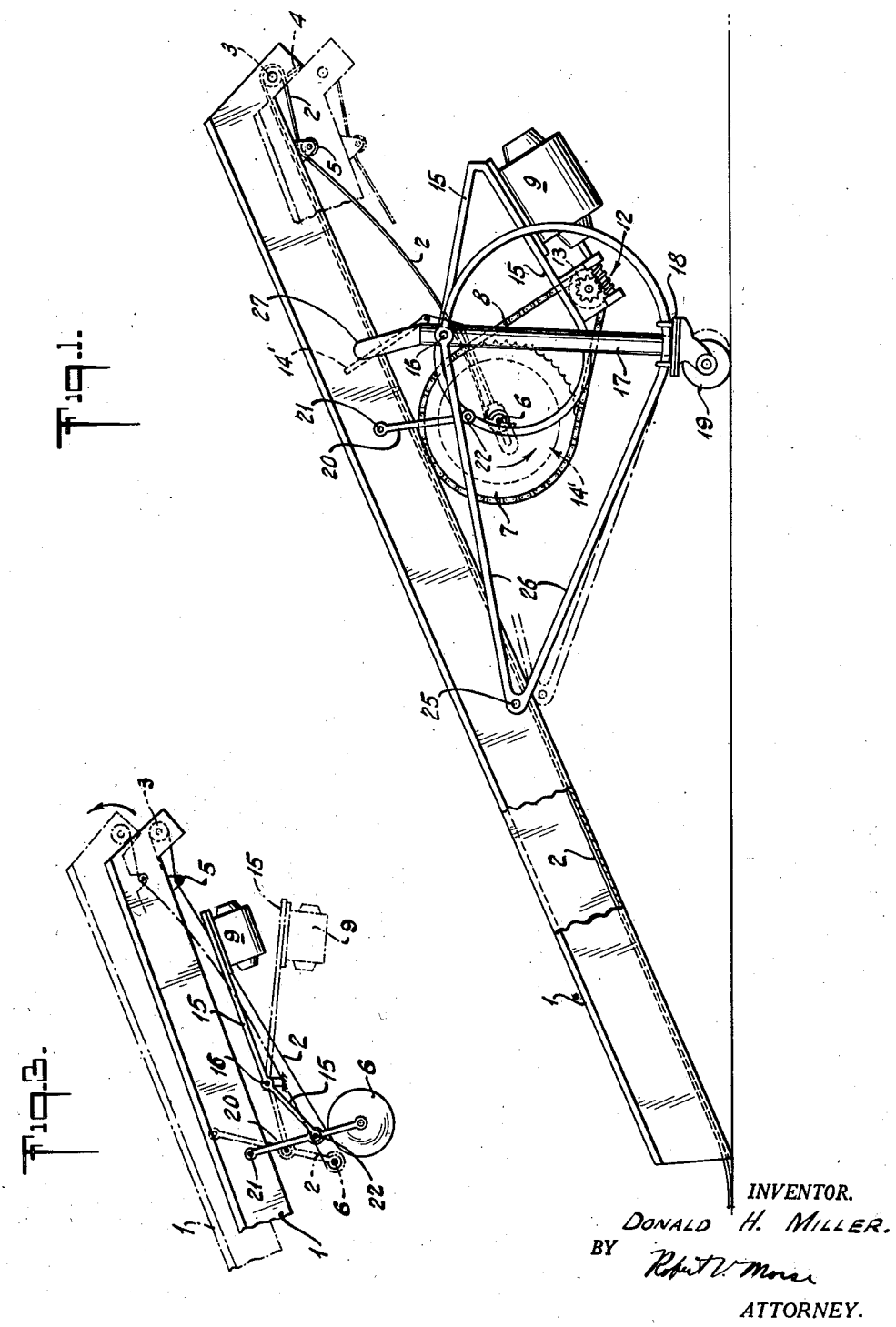
INVENTOR.
DONALD H. MILLER.
BY
ATTORNEY.

March 10, 1953 — D. H. MILLER — 2,630,907
STABLE GUTTER CLEANER
Filed June 21, 1951 — 2 SHEETS—SHEET 2
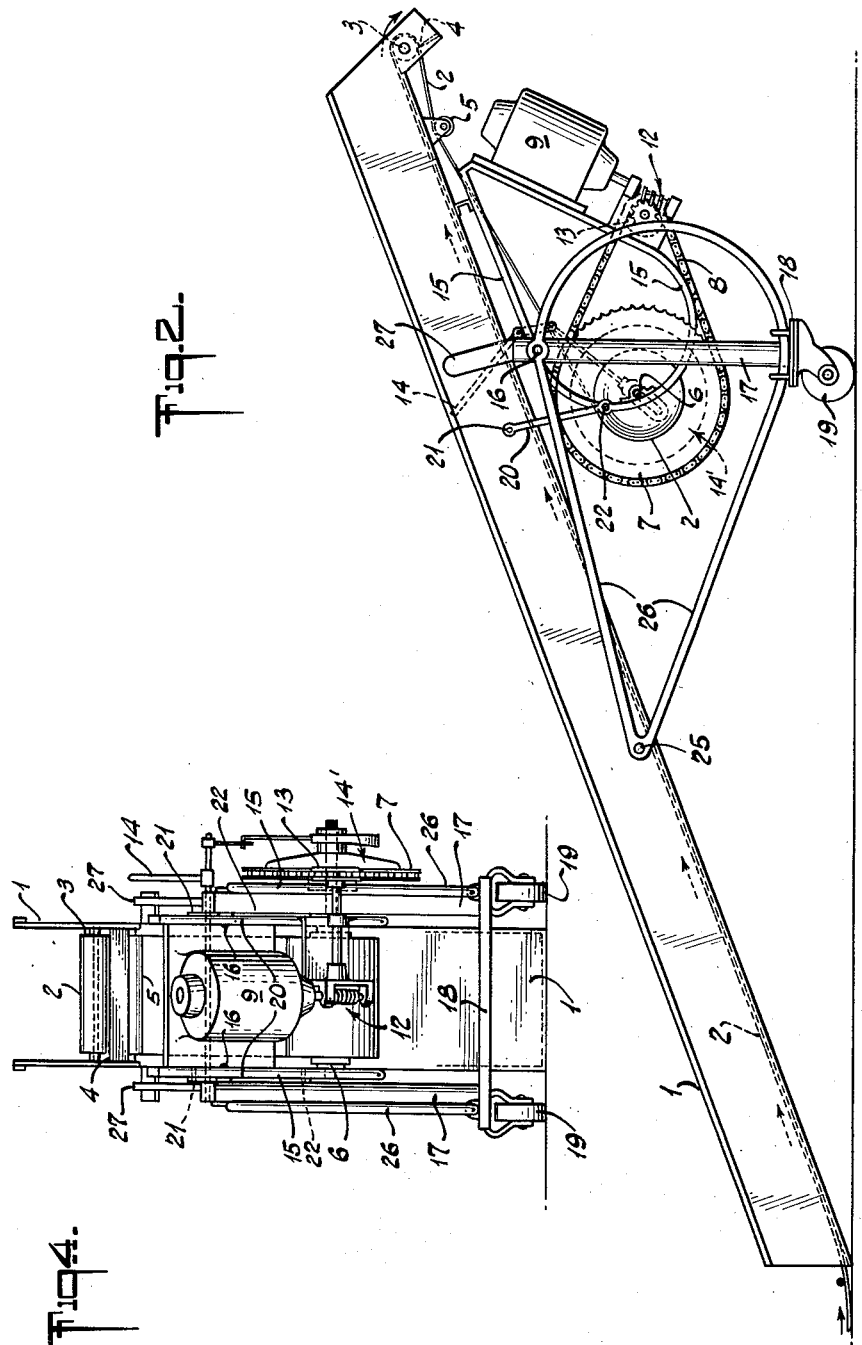
INVENTOR.
DONALD H. MILLER.
BY Robert V. Moran
ATTORNEY.

Patented Mar. 10, 1953

2,630,907

UNITED STATES PATENT OFFICE 2,630,907

STABLE GUTTER CLEANER

Donald H. Miller, Ithaca, N. Y., assignor to Cooperative Grange League Federation Exchange, Inc., Ithaca, N. Y., a corporation of New York Application June 21, 1951, Serial No. 232,837

3 Claims. (Cl. 198—121)

This invention relates to conveying machinery, and particularly to manure gutter cleaners for cow stables. Cleaning out the manure from stables or barns has long been a disagreeable task, and many modern barns are now constructed with a gutter in the floor along behind the row of cows, this gutter containing a rubber strip or belt about as wide as the gutter and running its length on which the manure can fall. Instead of shoveling out the manure, once a day the belt is pulled out thru a slot or low door in the side of the barn using a conveying machine which dumps the manure into a truck. Such machines having a conveyor belt that hooks on to the gutter belt are in common use, and as there is no particular novelty in belt connectors of which many forms are known, the belt system is here merely indicated diagrammatically. The principal novelty in the present invention is in the utilization of the weight of the belt to change the balance of the machine so as to make it handle more easily.

In larger barns there may be more than one row of cows and consequently more than one such belt and outdoor slot. The conveyor machine must then be maneuvered from one location to another, and should be such that it can be handled by one man. It is also desirable that the high end of the conveyor be well above the truck when maneuvering in place, yet down close to the truck body when delivering the manure; and that it again be raised when the loading is completed so that the machine can be easily moved to another location.

A principal object of the present invention is to reduce the labor in handling and moving this heavy machinery and to introduce semi-automatic action in the raising and lowering of the discharge end without appreciably increasing the weight or complexity of the machine. Under the present invention the machine is so balanced that it can easily be operated and moved about by one man. Other objects are to reduce the cost and upkeep; to discharge the manure and clean the belt satisfactorily; and to give an easy control.

Referring now to the drawings forming part of this specification,

Fig. 1 is a side elevation view of the machine with the belt slack and unwound as at the beginning of a loading operation, at which time the top of the chute is high so that it may swing over the top of a manure truck.

Fig. 2 is a side elevation view of the machine with the belt under tension and partly wound on its drum, this being the normal working position when the conveyor is discharging manure into the truck and the top of the chute is pulled down to the truck body by the belt tension.

Fig. 3 is a diagram of the supporting linkage by which the chute is raised and lowered, and by which the weight of the belt when wound on the drum is counterbalanced by the weight of the motor.

Fig. 4 is an end elevation view looking at the machine from the high end.

Similar reference numerals refer to similar parts thruout the various views.

Referring now to Fig. 1 and Fig. 2, the chute 1 up which the conveyor belt 2 carrying the manure is to be dragged has a bottom and two side walls as best seen in Fig. 4, and is provided with a roller 3 at its upper end around which the belt 2 may turn back to the winding machinery after dumping the manure in the truck. This belt 2 turns back thru a slot 4 at the discharge end of the chute 1 as best seen in Fig. 4, this slot acting as a scraper to clean the belt of any manure that has not fallen off in rounding the roller 3. The relatively clean belt then passes over an idler roller 5 and is wound on the reel or shaft 6 driven by the sprocket 7 and chain 8 powered by the motor 9. To increase the driving torque and reduce the speed from the high speed motor to the relatively low speed reel, the motor shaft first drives a reduction gear box 12 which in turn drives the small sprocket 13 of the chain drive 13—8—7 thru which the speed is still further reduced to provide the proper pull for the conveyor belt. In addition to the usual switch at the motor, a control lever 14 operates a clutch 14' on the large sprocket 7 so that there may be a prompt and close control of the belt without shutting off the motor.

The motor 9, reduction gear 12 and small sprocket 13 are mounted as a unit on the outer end of the loop frame 15 which is pivoted at 16 near the tops of the supporting posts 17. These posts 17 are on a base frame 18 mounted on casters 19 so that the whole machine can be easily moved about. As shown in Fig. 1 in broken lines, the casters 19 roll slightly to accommodate the action when the chute goes up and down. The frame 15 need not necessarily be made in the form of a loop as shown, since kinematically any rigid beam would suffice; but it is preferably made of a loop of tubing as shown in order to reduce the weight of the structure.

Links 20 are pivotally attached at 21 to the sides of the chute 1 at one end and at the other end they are pivotally attached at 22 to the frame 15 at a location on the opposite side of the main pivots 16. These pivots 16 form the fulcrum on which the weight of the motor 9 on one side and the chute 1 at links 20 on the other side are somewhat balanced. In Fig. 1 the motor end of the loop frame is shown as down and the chute 1 up, while in Fig. 2 the motor end of the frame 15 is shown swung up and the chute 1 down. Other factors that enter into the balancing of forces are the conveyor belt tension and the accumulated weight of the conveyor belt when it is wound on the reel 6, as will be described.

The reel 6 with its driving sprocket 7 has its bearings mounted on the loop frame 15 on the opposite side of the fulcrum pivot 16 from the motor 9, so that the accumulated weight of the conveyor belt 2 on the reel 6 as it winds up is counterbalanced to some extent by the weight of the motor 9. Also the tension of the conveyor belt 2 when the power is on tends to raise the motor 9 since the belt 2 passes below the pivot 16 and so tends to rotate the pivoted structure in a direction opposite to that in which it would be turned by the weight of the motor.

The chute 1 itself is also attached at the pivots 25 to the relatively fixed loop frame 26 which is bolted to the base of the supporting posts 17 and also secured near the top of the posts. This frame 26 also of course need not be a loop but is so made for the sake of lightness. Side guides 27 are built on the top of the posts 17 to steady the chute 1 laterally as it goes up and down.

The whole machine is so nearly balanced on the casters 19 that one man has no difficulty in trundling it about and inserting it at the proper gutter to haul out its manure belt. At such times the belt is slack, the motor is down, and the upper end of the delivery chute is high so that it will easily swing over the side of the truck into which the manure is to be loaded. But as soon as the belt is hooked on, the motor started and the machine starts to draw the manure out of the barn, the tension on the belt pulls the top of the chute down close to the side of the truck so that the manure is discharged where wanted. At the same time the motor 9, acting as a counterweight, is lifted to the position shown in Fig. 2. At the end of the loading operation, when the power is shut off and the belt tension reduced, the weight of the motor is nicely counterbalanced by the weight of the belt on the reel, so that the chute is easily lifted off the side of the truck. These lifting and lowering actions are practically automatic, without any jacking up or lowering by the operators, and save considerable time and effort in maneuvering the machine.

A kinematic diagram is shown in Fig. 3 to aid in following the movements of the links and levers involved in the raising and lowering of the chute. The lowered position is indicated by solid lines and the raised position in broken lines. Reference numerals correspond to those on the actual parts illustrated in Fig. 1 and Fig. 2. It will be understood from the laws of mechanics that the shape or curvature of a lever does not change its action so long as it is rigid between the points where the forces are applied. This permits the kinematic diagram to be somewhat simpler than the structure shown in Fig. 1 and Fig. 2.

Referring now to Fig. 3, it will be seen that the principal motions are about the fixed fulcrum pivot 16. The weight of the motor 9 is at the end of the long lever arm 15, while on the opposite side of the fulcrum 16 shorter arms of that same lever 15 carry the weight of the reel 6 and the chute 1, the latter being supported on the link 20. The conveyor belt 2 extends from the reel 6 to the upper end of the chute 1, and when under tension the belt tends to turn the lever 15 and its associated parts in a counter-clockwise direction about the fixed pivot 16. This results in the position shown in solid lines in Fig. 3, corresponding to Fig. 2 in the drawings, with the top of the chute pulled down.

When the power is off and the belt 2 no longer under tension, the parts are free to seek their static equilibrium, and at that time the weight of the motor 9 on its long lever arm more than balances the forces at the shorter lever arms on the other side of the fulcrum point 16, so that the motor 9 drops to the position shown in broken lines, corresponding to Fig. 1, and the top of the chute 1 is lifted.

The general operation of the machine will be evident from the foregoing. The two casters on which it is substantially balanced pivot in any direction so that the machine can be easily moved sideways as well as forward and back; and after the lower or pick-up end of the chute is put at the gutter hole in the stable the upper end can be brought into line. While the lower or gutter end of the chute is somewhat heavier than the top so that when at rest the machine tends to stay with its gutter end on the ground as shown in the drawings, it is nearly enough balanced so that one man has no difficulty in lifting the long end if necessary to maneuver it about. The overall lightness and balance characteristic of this device make it feasible for use on many farms where the prior machines have been found to be too cumbersome.

While I have in the foregoing described certain specific forms by way of example, it will be understood that they are merely for purposes of illustration to make clear the principles of the invention, which is not limited to the particular forms shown, but is susceptible to various modifications and adaptations in different installations as will be apparent to those skilled in the art without departing from the scope of the invention as stated in the following claims.

I claim:

1. In a manure gutter cleaner for stables, the combination of a base frame, fulcrum pivots carried on the base frame, a motor frame mounted to swing up and down on said fulcrum pivots, a motor on said motor frame, a conveyor chute, a supporting link mechanism attached near the middle of said chute so that the chute is partly balanced, said supporting link mechanism being attached to said swinging motor frame on the opposite side of the fulcrum pivots from that of the motor so that swinging the motor downward will lift the chute and vice versa, a reel mounted on said swinging motor frame on the opposite side of the fulcrum pivots from that of the motor so as to partly counterbalance the motor, a conveyor belt on said reel, said conveyor belt extending under the fulcrum pivots and past the motor to the upper end of said chute when in operation so that the tension of the belt tends to pull the upper end of the chute down and lift the motor up, said conveyor belt being adapted to be attached to a manure gutter belt of a stable so as to drag it up the chute to dump the manure and wind the manure belt on said reel, the accumulated weight of the belt on the reel aiding to counterbalance and lift the motor, and a speed reduction drive between the motor and the reel.

2. In a manure gutter cleaner for stables, the combination of a base frame, casters supporting said base frame, fulcrum pivots carried on the base frame, a swinging loop frame pivotally mounted on said fulcrum pivots, a motor mounted on said loop frame to swing up and down therewith, a conveyor chute, a supporting link mechanism attached near the middle of said chute so that the chute is partly balanced, said supporting link mechanism being attached to said swinging loop frame on the opposite side of the fulcrum pivots from that of the motor so that swinging the motor downward will lift the chute and vice versa, a reel mounted on said swinging loop frame on the opposite side of the fulcrum pivots from that of the motor so as to partly counterbalance the motor, a conveyor belt on said reel, said conveyor belt extending under the fulcrum pivots and past the motor to the upper end of said chute when in operation so that the tension of the belt tends to pull the upper end of the chute down and lift the motor up, said conveyor belt being adapted to be attached to a manure gutter belt of a stable so as to drag it up the chute to dump the manure and wind the manure belt on said reel, the accumulated weight of the belt on the reel aiding to counterbalance and lift the motor, and a speed reduction drive between the motor and the reel.

3. In a manure gutter cleaner for stables, the combination of a base frame, fulcrum pivots carried on the base frame, a motor frame mounted to swing up and down on said fulcrum pivots, a motor on said motor frame, a conveyor chute, a supporting link mechanism attached near the middle of said chute so that the chute is partly balanced, said supporting link mechanism being attached to said swinging motor frame on the opposite side of the fulcrum pivots from that of the motor so that swinging the motor downward will lift the chute and vice versa, a reel mounted on said swinging motor frame on the opposite side of the fulcrum pivots from that of the motor so as to partly counterbalance the motor, a conveyor belt on said reel, said conveyor belt extending under the fulcrum pivots and past the motor to the upper end of said chute when in operation so that the tension of the belt tends to pull the upper end of the chute down and lift the motor up, said conveyor belt being adapted to be attached to a manure gutter belt of a stable so as to drag it up the chute to dump the manure and wind the manure belt on said reel, the accumulated weight of the belt on the reel aiding to counterbalance and lift the motor, a speed reduction drive between the motor and the reel, and a clutch in said drive between the motor and the reel.

DONALD H. MILLER.

No references cited.